(12) United States Patent
Randal et al.

(10) Patent No.: US 12,259,856 B2
(45) Date of Patent: Mar. 25, 2025

(54) MANAGING AND PROVIDING A RULE INDEPENDENT DATA MODEL

(71) Applicant: Caret Holdings, Inc., Columbus, OH (US)

(72) Inventors: Jason Christopher Miller Randal, Naperville, IL (US); Derrick Spell, Oswego, IL (US)

(73) Assignee: CARET HOLDINGS, INC., Columbus, OH (US)

( * ) Notice: Subject to any disclaimer, the term of this patent is extended or adjusted under 35 U.S.C. 154(b) by 57 days.

(21) Appl. No.: 18/045,788

(22) Filed: Oct. 11, 2022

(65) Prior Publication Data

US 2024/0119030 A1 Apr. 11, 2024

(51) Int. Cl.
*G06F 16/21* (2019.01)
*G06F 16/23* (2019.01)
*G06F 16/248* (2019.01)

(52) U.S. Cl.
CPC ........ *G06F 16/212* (2019.01); *G06F 16/2365* (2019.01); *G06F 16/2379* (2019.01); *G06F 16/248* (2019.01)

(58) Field of Classification Search
CPC .......................... G06F 16/212; G06F 16/2379
USPC .......................................................... 707/694
See application file for complete search history.

(56) References Cited

U.S. PATENT DOCUMENTS

| | | | | |
|---|---|---|---|---|
| 9,798,787 | B1* | 10/2017 | Beard | G06F 16/9535 |
| 11,831,521 | B1* | 11/2023 | Dhake | H04L 41/22 |
| 2006/0195460 | A1* | 8/2006 | Nori | G06F 16/252 |
| 2013/0339471 | A1* | 12/2013 | Bhargava | G06F 3/0683 |
| | | | | 709/213 |
| 2020/0226002 | A1* | 7/2020 | MacLeod | G06F 8/71 |

\* cited by examiner

*Primary Examiner* — Muluemebet Gurmu
(74) *Attorney, Agent, or Firm* — SCHWEGMAN LUNDBERG & WOESSNER, P.A.

(57) ABSTRACT

A rule independent and view agnostic data model is provided. The data model retains contexts for data associated with a resource through a lifecycle of the resource. A set of the data that corresponds to a particular context can be returned through interfaces to users and/or workflows for any given point in time in the lifecycle and/or for any given event during the lifecycle. Each set of data is associated with an event in the lifecycle. Particular data within a given set of data for a resource can be resolved to provide a particular context using a durability property feature set on entities of the data in the data model to reference past data maintained for other past events associated with the entities during of the lifecycle of the resource.

17 Claims, 5 Drawing Sheets

MANAGING AND PROVIDING A RULE INDEPENDENT DATA MODEL

Many services offered by organizations rely on evaluations of underlying captured data maintained within database records, logs, or other data structures. The fields of the data structure are typically dependent on what the services need to perform their evaluations. This means that intentionally or unintentionally the fields and attributes of the data structures are often dependent on calculations, which the services need to perform on the underlying data.

However, some organizations such as insurance companies, banks, and national or regional retailers have jurisdictional compliance regulations that can vary between each jurisdiction. Thus, the services provided by these organizations may maintain many different databases or multiple views of a single database because the underlying records, their corresponding fields, and attributes need to fit the data being evaluated by the services. Additionally or alternatively, the organizations may have a single database for the jurisdictions while maintaining multiple different versions of the services. In this case, maintaining multiple different services can be more costly and time consuming than it would be to have multiple different databases or database views for each jurisdiction.

Furthermore, often an organization needs to prove to regulatory authorities that their services are in compliance and/or are non discriminatory to their customers across several jurisdictions. For a multi-jurisdictional organization this can be a significant manual effort to obtain the compliance data across multiple databases or a single database with multiple views because the underlying data structure of the data is dependent on regulations of each jurisdiction such that once compliance data is obtained for each jurisdiction it has to be combined, evaluated, and provided across multiple jurisdictions. Compliance requests can also span multiple years such that there is no guarantee that the underlying data structure still includes the necessary compliance data; the organizations may not be able to comply with the requests or may have to work off of multiple different saved versions of the databases or views, which can add significant cost and time delays in providing the requisite compliance data.

DETAILED DESCRIPTION

As stated above maintaining accurate data assets can be challenging for multi-jurisdictional organizations where regulations for each jurisdiction have to not only be complied within each jurisdiction but may also have to be used to prove organizational compliance during a time period that can span multiple different versions of the data assets. The data models for these data assets often consist of multiple different underlying data structures or multiple views on a data structure, each data structure or each view dependent on a given jurisdiction's rules or regulations.

In fact, it is not just multi-jurisdictional organizations that rely on data models for their data assets, which are dependent on rules associated with the services that consume the data, as even single jurisdictional organizations have rule dependent underlying data structures. That is, the underlying data structures of most organizations are organized based on specific rules or views needed by their services. As a result when features are added to a given service of an organization, significant software work is needed to modify the underlying data structures and maintain compatibility with other services of the organization.

In various embodiments, methods and a system for managing and providing a rule independent or view agnostic data model are presented. A data model is provided along with interfaces for accessing the data model. The data model is rule independent and view agnostic meaning the data model is not dependent upon on the existing services or workflows that consume the underlying data of the data model. The underlying data structure includes sets of event-based data for a given resource. Each set of event-based data identifies entities and their corresponding assigned facts that correlates to a given event. A fact can include a durability property feature, which indicates where the fact or facts associated with a corresponding entity are to be obtained from within the sets of event-based data being maintained for the corresponding resource. The durability property feature can be assigned a value that is associated a type of provenance associated with the given entity and that entity's fact of facts, such that an updated version (context) and/or different versions (contexts) for a given entity of a given resource's sets of event-based facts can be obtained directly from the underlying data structure via the interfaces. This allows workflows and/or users to obtain a needed set of event-based facts for a given entity of a given resource within a defined context without the need for maintaining multiple views or rules hardcoded on the data model.

As used herein, a "resource" is an asset for which information is maintained and tracked within an instance of a data module. For example, a resource can be a user, a system, a service, an account or a policy of a user being maintained by an organization, custom collections of users, systems, accounts, and/or policies, etc.

As used herein, a "fact" is an uninterpreted value; for example, a date of birth, model number of an asset, type of asset, etc. A fact can include a data type identified by a field name (hereinafter referred to as "field"). The field may also be referred to as an entity and corresponding entity type and entity identifier, as discussed below. The entity can include one or more facts.

A "feature" is an interpreted value derived from one or more facts by processing calculations or applying rules. An "event" is a specific moment in time during a lifecycle of a resource that correlates to a categorized type for the event; for example, a new business or a renewal within the insurance context.

An "entity" is a type, an identifier, and/field representing a higher-level data information element within a data model; for example, a driver, a vehicle, a profile, etc. An entity can be assigned or associated with one or more facts.

A "fact set" is an event identifier and a set of entities (fields), representing all the specific facts (uninterrupted values) for the entities as known at a specific moment in time associated with the event.

"Provenance" is an origin event for an entity within the scope of a bounding type of event; for example, for each driver (entity) in a new resource (policy) fact set, the driver's policy provenance is the first and newly added fact set; a driver added subsequently via endorsement, the endorsement event is that driver's policy provenance. Provenances are properties of entities, and therefore fact oriented and include data values that are uninterrupted as facts. Provenances can be computed by tracking backwards through events and persisting the association, or lazily computed, determined just in time without persistence. Provenances can be a variety of custom-set types. For example, in the insurance context, provenances can include policy provenances and term provenances.

"Durability" is a property of a feature indicating how long the value should remain constant through subsequent events during the lifecycle of a resource. Durability is provenance's feature complement. That is, for each type of provenance there is a corresponding type of durability; a specific durability type corresponds to a specific provenance type. Given a constant feature formula and durability configuration, a feature can be recomputed consistently over subsequent events by always utilizing facts from the same event. For example, a driver's (an entity's) violation points have term durability in the insurance context, which means one wants the value for violation points to remain constant until a renewal event, when the next term begins. For each event during the term, violation points can be consistently recomputed using the set of facts from the term provenance of each driver entity. Even if new incidents occur mid-term, the feature evaluation can ignore the new facts and continue to use the facts as they existed when the driver joined the term; it is only when a renewal event occurs that the violation points are recalculated and assigned as facts to the driver entity.

A "fact set log" is a collection of fact sets for a given resource, representing precise facts known at every important event in the resource's lifecycle. The log is traversable by tracing the graph of provenances. Each fact set log for a given resource is maintained as an instance of a data model or an instance of a data structure and a plurality of data module/data structure instances are maintained in a data store for a given organization that managers resources.

Figure 1A:
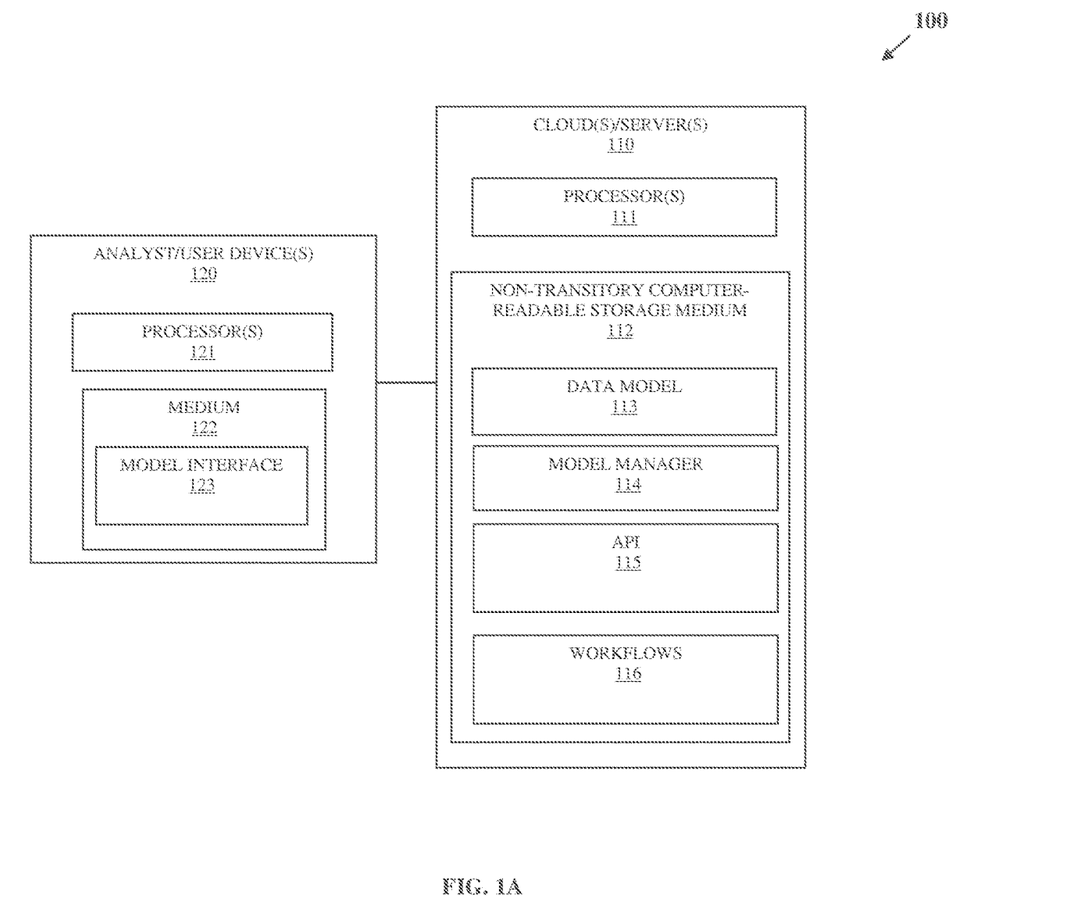
FIG. 1A is a diagram of a system for managing and providing a rule independent data model, according to an example embodiment.

FIG. 1A is a diagram of a system for managing and providing a rule independent and/or view agnostic data model, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of managing and providing a rule independent and/or view agnostic data model, presented herein and below.

A fact set log is established for each resource of an organization. The fact set log is a data structure or data model. The instances of the data model for the resource of a given organization is maintained in a data store for the organization. Resources and their corresponding fact set log (data model) can be added (created), removed from the data (deleted), updated, searched, and managed from the data store via interfaces.

Each entry within a fact set log corresponds to a time-based event in a lifecycle of the resource. So, a same type of event in the lifecycle can repeat during the lifecycle such that recurring events are maintained and recorded in the fact set log and each event distinguishable by a time stamp. Each entry for each event identifies the entities associated with the resource for that event and the corresponding one or more assigned facts (uninterrupted values) associated with each corresponding entity.

This data model provided from the fact set log (data model) allows contexts for features that are calculated using the entities and their facts to be replayed and reproduced consistently during the lifecycle of the resource from the resource's fact set log. This capability is a significant advantage to an organization by providing the organization the capabilities to quickly, accurately, and consistently reproduce any given context used to calculate the features for purposes of demonstrating compliance and/or impartiality against any claims being asserted by governmental agencies and/or customers of the organization.

Any given entity identified within any given entry of the fact set log can be associated with a durability property feature, which identifies where the corresponding entity's fact set is to be resolved from previous fact sets associated with that entity within the fact set log. The durability property feature can be assigned a value associated with different provenance types. The provenance types are associated with key events of the entities. In an embodiment, the provenance types are 1) resource creation or policy provenance (policy creation) when the resource is a policy/ account and 2) renewal policy or term policy provenance. It is noted that the provenance type is identified by the value set on durability property feature for a given entity. Furthermore, the provenance types can be custom defined and can include more than just the two provenance types (policy and term) recited above.

As stated above, a collection of the fact set logs are maintained in a data store for an organization that manages resources. Interfaces are provided for creating, deleting, updating, and searching and the fact set logs from the data store. Moreover, searching and updating operations provided through the interfaces permit search criteria that can include the durability property feature and their corresponding set values, which identify the corresponding provenance types.

In an embodiment, a fact set log is a linked list maintained for a given resource. Each element of the linked list corresponding to an event in a lifecycle of the corresponding resource, and each event associated with one or more entities, each entity having its own unique fact set. Each element of a given link list corresponds to a given lifecycle event for the resource, the corresponding entities for that event, and each entity's fact set. Each entity's fact set can be resolved during interface operations via recorded facts as noted in the linked list for the corresponding entity or can be resolved via a pointer/reference that is associated with a durability property feature set on that entity, pointer/reference links the fact set for the entity to the entity's previous fact set for a previous event in the lifecycle of the resource. Each set of resolved fact sets for the entities defines a context for the entities of the resource at a given point in time and for a given event in the lifecycle of the resource. The fact sets for a given context can be used to consistently calculate features, which rely on the fact sets, to replay or to reproduce the features that existed for the context at a specific point in time during a lifecycle of the resource.

System 100 includes one or more clouds 110 or servers 110 (hereinafter just "cloud" 110") and one or more analyst/user operated devices 120. Cloud 110 includes at least one processor 111, a non-transitory computer-readable storage medium (hereinafter just "medium") 112. Medium 112 includes executable instructions for a model manager 114, an Application Programming Interface (API) 115, and one or more workflows 116. The executable instructions when executed by processor 111 cause processor 111 to perform operations discussed herein and below with respect to 114-116. Medium 112 also includes data model 113 managed and maintained by model manager 114 and API 115.

Each analyst/user device 120 (hereinafter just "device 120") includes a processor 121 and a medium 122, which includes executable instructions for a model interface 123. The executable instructions when executed by processor 121 cause processor 121 to perform operations discussed herein and below with respect to 123.

Model manager 114 maintains a data store associated with data model 113. Data model 113 comprises a data structure per resource. The data structure is defined as the fact set log discussed above. Each entity within the fact set log for a given event can or may not include a durability property feature that identifies a location within the fact set log to obtain the corresponding entity's fact set for purposes of calculating a feature associated with corresponding event of the resource's lifecycle.

Figure 1B:
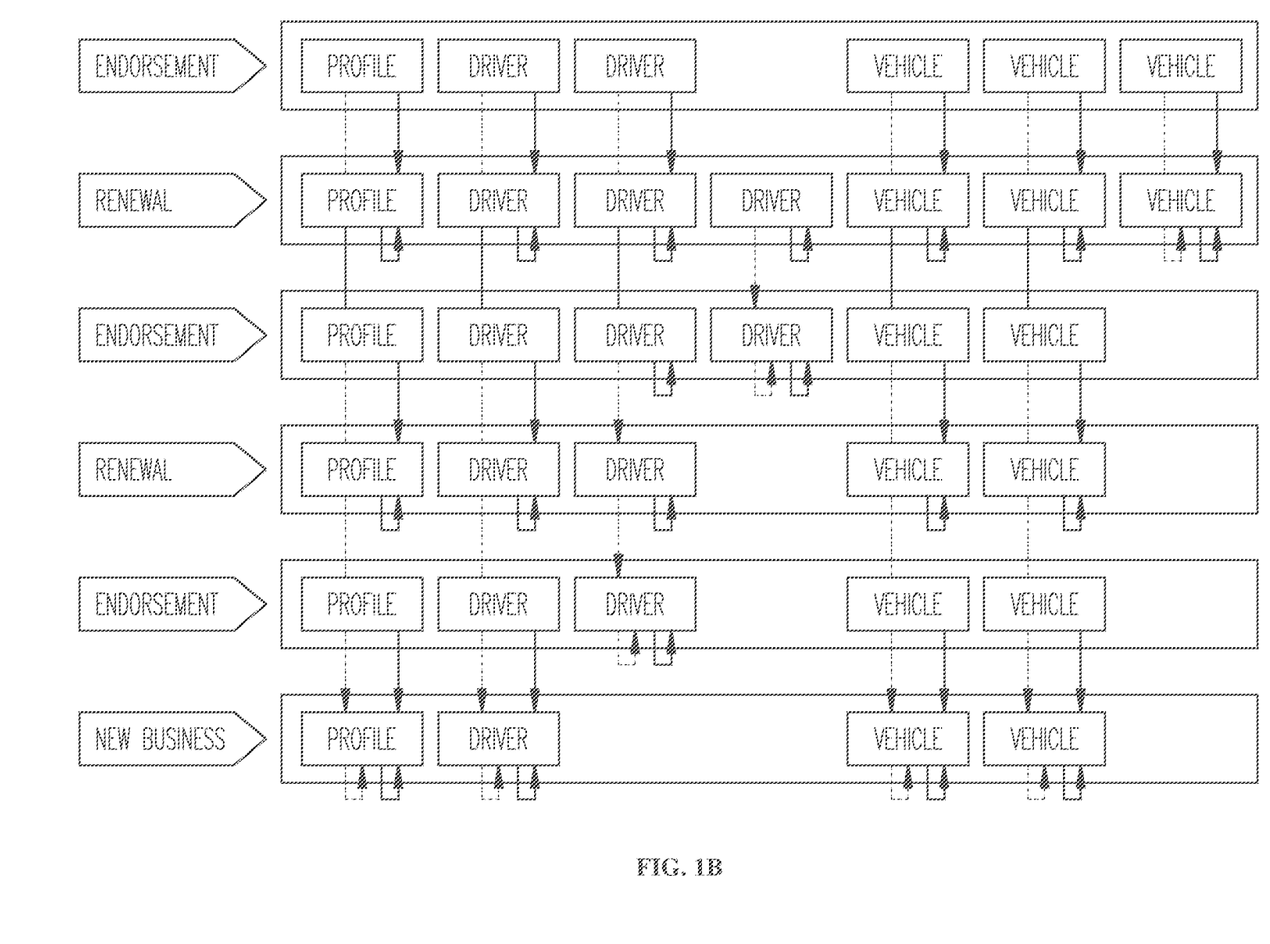
FIG. 1B is a diagram of an example view of a rule-independent data model, according to an example embodiment.

FIG. 1B is a diagram of an example view of a rule-independent and view agnostic data model, according to an example embodiment. The example view illustrates a resource associated with an insurance policy. The example lifecycle events for the policy are shown in FIG. 1B as new business, three occurrences of endorsement, and two occurrences of renewal. The view illustrates 6 events in the rows depicted in the view. The entities are illustrated, for each event and in each row, as profile, a first driver (leftmost first occurrence of "driver" in FIG. 1B), a second driver (next to the first driver), a third driver (next to the second driver), a first vehicle (leftmost first occurrence of "vehicle" in FIG. 1B), a second vehicle (next to the first vehicle), and a third vehicle (next to the second vehicle). Lines between entities and across the events illustrate two types of provenance identified by values assigned the durability property feature and set on the entities for identifying the entities' fact sets. Fact sets for the entities or data values assigned to the entities within a given fact set are not illustrated in FIG. 1B. The origin of the facts sets for the entities having the durability property feature is illustrated by two arrows depicted on the entities.

For example, a first type of provenance is associated with a policy provenance type. This is identified within the fact set log by placing a durability property feature with a value of policy provenance on the profile entity during the new business event (creation of the policy). The leftmost line on the profile entity in FIG. 1B illustrates the pointer/reference within the fact set log for the policy entity that traverses through each of the 5 subsequent events back to the new business event (first event) where the fact set associated with the profile entity can be resolved from the facts identified in the new business event for the policy.

The leftmost line or arrow on each entity illustrates policy provenance implemented by a durability property feature assigned a value that identifies the policy provenance type and set on the corresponding entity using a pointer/reference. The arrows emerging from an entity and looping back to the same entity are to illustrate the event for which that entity's fact set was last obtained.

A second type of provenance for term is shown as the rightmost line or arrow with each entity in FIG. 1B. These entities have an assigned value of term provenance to their corresponding durability property feature. Term provenance references back to an event associated with a most recent renewal event whereas policy provenance references back to when the corresponding facts for the corresponding entity was first added to the policy, which can be when the policy was created in the case of the policy holder's profile at the new business event, or which can be when a second driver and when a third driver was added to the policy at the second event from bottom (for the second driver) and again at the fourth event from bottom (for the third driver). A new vehicle was also added to the policy at the fifth event from bottom.

Workflows 116 that receive updated or new entities and their fact sets can update data model 113 directly through APIs 115 or through model manager 114. Additionally, model interface 123 of devices 120 interact with model manager 114 to access data model 113. Interface 123 permits an analyst/user to define queries or reports to access data model 113 for the resources.

In an embodiment, the query can specify on an entity a durability property feature with an assigned provenance type value as query criteria associated with a search. For example, a workflow 116 associated with an automated service that calculates a renewal premium using features, which are calculated from fact sets of a policy holder. The automated service can use API 115 to construct query criteria for the policy to return the necessary fact sets, which are then used to calculate the features and determine the renewal premium. The constructed query or search criteria is passed through API 115 to model manager 114 from the automated services as a search of a data store that includes instances of the data model 113 (fact set logs). The search criteria can be defined for a policy holder X as: "event=endorsement; policy_holder=X; profile=policy_durability; vehicle=term_durability." API 115 interacts with model manager 114 to access the data store with the data models 113 and to return a set of facts associated with an endorsement event. The automated service calculates a premium for the policy holder based at least in part on features calculated from the returned set of facts (fact sets) and provides the premium to the policy holder via other interfaces.

As another example, suppose an analyst wants to identify all policies active on a predefined date to determine whether an organization is in compliance based on features used by a workflow 116 that are derived at least in part from fact sets on the predefined date. The analyst inputs a query via model interface 123 from device 120 to model manager 114 as follows "active date=X; profile=policy_durability or profile=term_durability". Data model 113 processes the queries against the data store of data models 113 (fact set logs 113) to return all policy holders and their set of facts via interface 123. The fact sets returned are used to derive the features and the features are processed by workflow 116 to demonstrate compliance of the organization.

In an embodiment interface 123 can be a mobile application and/or a browser-based application accessible via web pages hosted from cloud 110 and accessible through a browser of device 120. In an embodiment, multiple independent instances of model manager 114, API 115, and workflows 116 are distributed across multiple servers of cloud 110 and processed concurrently with one another to access data model 113

System 100 permits a context that existed for a given resource's data assets at any given point in time or for any given event to be returned as a set of facts/fact sets. This can in some instances reduce the need for version control as versioning can be resolved as a returned context. Data model 113 allows for the contexts of the facts to be retained such that features calculated from the facts are always available for all contexts during a lifecycle of a resource. This improves compliance operations and reduces a need to maintain different versions of services associated with workflows 116. Data model 113 removes the need of organizations to maintain multiple views on the data store and/or maintain hardcoded rules for access to the data store. System 100 provides a rule independent and view agnostic data model 113 for a data store of an enterprise.

The above referenced embodiments and other embodiments are now discussed with reference to FIGS. 2A, 2B, and 3.

Figure 2A:
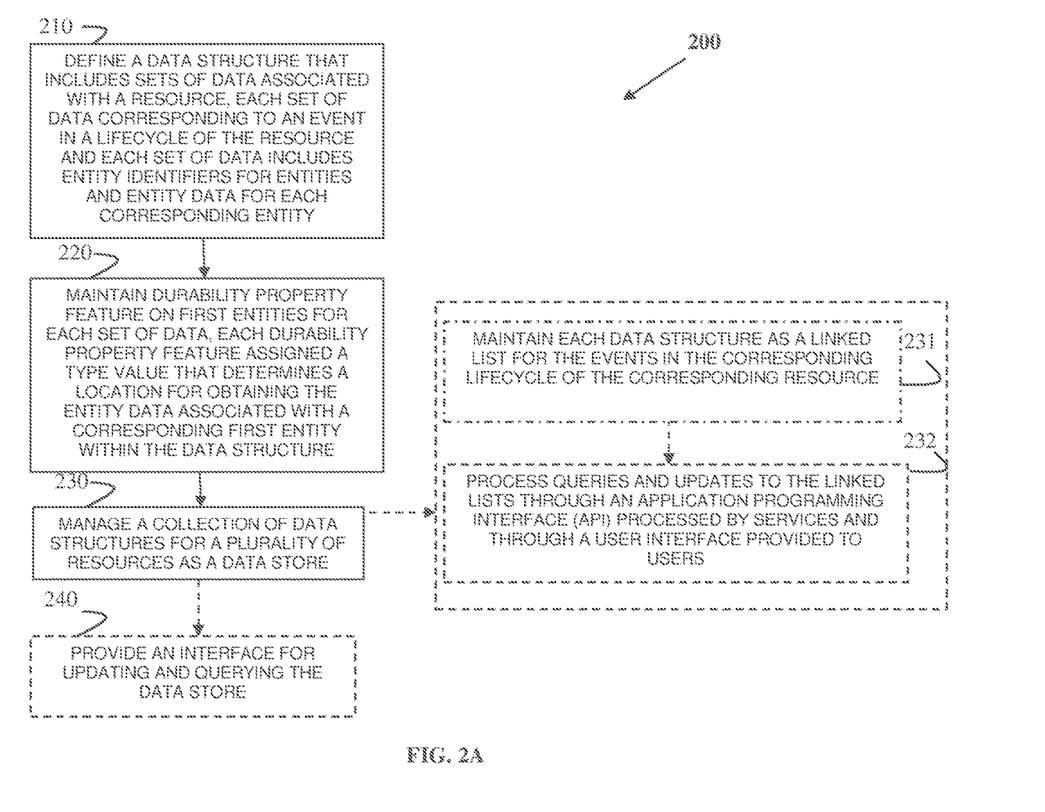
FIG. 2A is a flow diagram of a method for managing and providing a rule independent data model, according to an example embodiment.
Figure 2B:
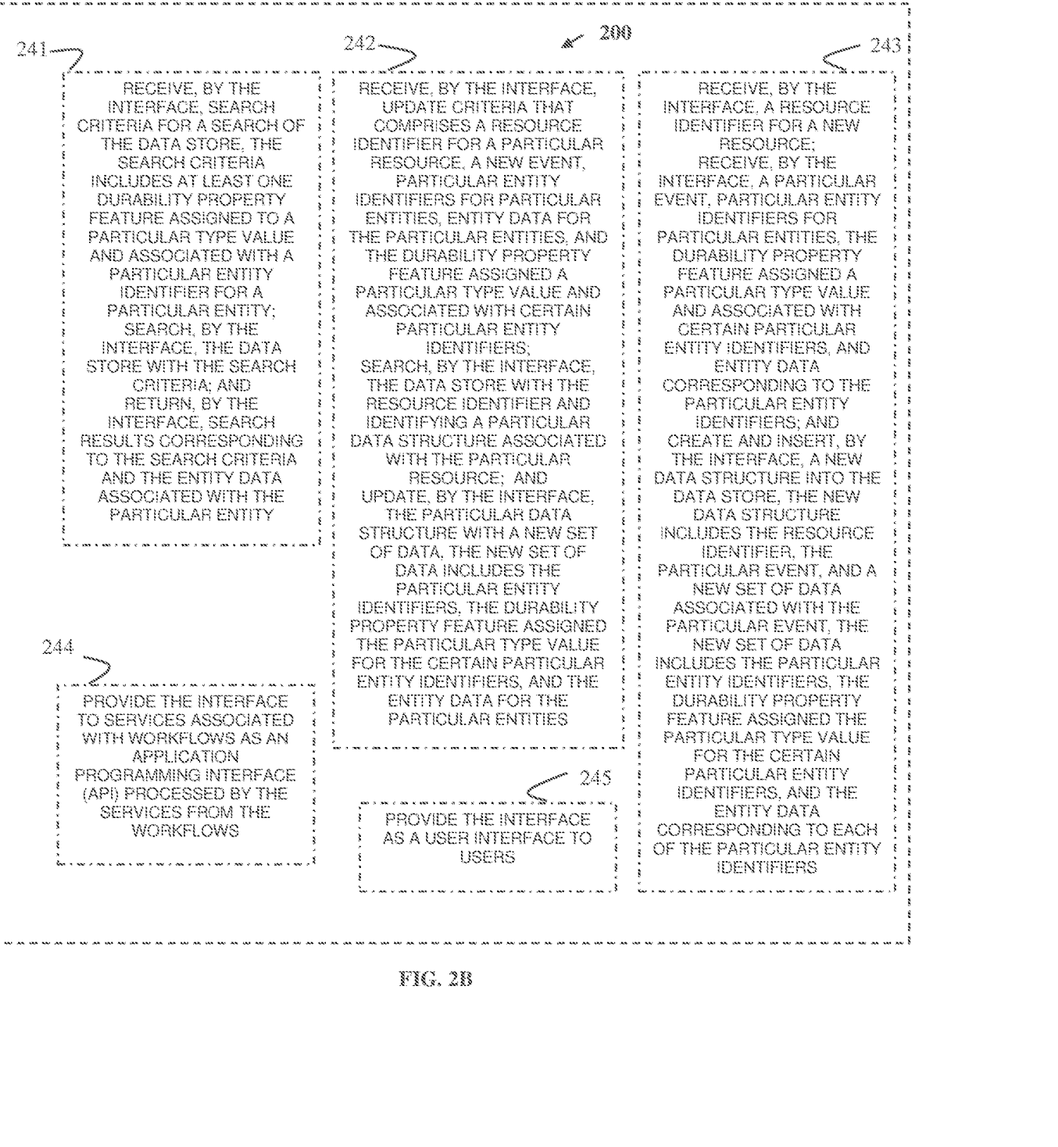
FIG. 2B is a diagram illustrating additional embodiments of the method of FIG. 2A

FIGS. 2A and 2B is a flow diagram of a method 200 for managing and providing a rule independent data model, according to an example embodiment. The software module (s) that implements the method 200 is referred to as a "view agnostic data manager." The view agnostic data manager is implemented as executable instructions programmed and residing within memory and/or a non-transitory computer-readable (processor-readable) storage medium and executed by one or more processors of one or more devices. The processor(s) of the device(s) that executes the view agnostic data manager are specifically configured and programmed to process the view agnostic data manager. The view agnostic data manager may have access to one or more network connections during its processing. The network connections can be wired, wireless, or a combination of wired and wireless.

In an embodiment, the device that executes the view agnostic data manager is the cloud 110. In an embodiment, the device that executes the view agnostic data manager is server 110.

In an embodiment, the view agnostic data manager is all or some combination of 113, 114, 115, 116, and/or 123. The view agnostic data manager presents another and, in some ways, enhanced perspective of system 100.

At 210 (shown in FIG. 2A), the view agnostic data manager defines a data model 113 or data structure 113 that includes sets of data associated with a resource. Each set of data corresponding to an event in a lifecycle of the resource and each set of data includes entity identifiers for entities and entity data for each corresponding entity.

At 220 (shown in FIG. 2A), the view agnostic data manager maintains durability property feature on first entities for each set of data. Each durability property feature assigned a type value that determines a location for obtaining the entity data associated with a corresponding first entity within the data structure 113.

At 230 (shown in FIG. 2A), the view agnostic data manager manages a collection data models/structures 113 as a data store. That is a plurality of resources for which fields/facts and corresponding values are maintained in the data store. Each instance of the data model/structure 113 is associated with a unique one of the resources.

In an embodiment, at 231 (shown in FIG. 2A), the view agnostic data manager maintains each data model/instance 113 as a linked list (e.g., a fact set log). Each linked list includes the events for the corresponding lifecycle of the corresponding resource. Each event associated with one or more entities and each entity's fact set.

In an embodiment of 231 and at 232 (shown in FIG. 2A), the view agnostic data manager processes queries and updates to the linked lists through an API 115 and through a model/user interface 123.

In an embodiment, at 240 (shown in FIG. 2A), the view agnostic data manager provides an interface 115 and/or 123 for updating and querying the data store. The interface permits creation of a new instance of the data model/structure 113, deletion of a particular data models/structures 113, and/or modification to values maintained in the sets of data for any given data model/structure 113 of the data store.

In an embodiment, at 241 (shown in FIG. 2B), the interface receives search criteria for a search of the data store. The search criteria includes at least one durability property feature assigned a particular type value and associated with a particular entity identifier for a particular entity. The interface searches the data store with the search criteria and returns search results corresponding to the search criteria and the entity data associated with the particular entity.

In an embodiment, at 242 (shown in FIG. 2B), the interface receives update criteria and particular that includes a resource identifier for a particular resource, a new event, particular entity identifiers for particular entities, entity data for the particular entities, and the durability property feature assigned a particular type value and associated with certain particular entity identifiers. The interface searches the data with the resource identifier and identifies a particular data model/structure 113 associated with the particular resource. The interface updates the particular data model/structure 113 with a new set of data. The new set of data includes the particular entity identifiers, the durability feature assigned the particular type value for the certain particular entity identifiers, and the entity data for the particular entities.

In an embodiment, at 243 (shown in FIG. 2B), the interface receives a resource identifier for a new resource. The interface further receives a particular event, particular entity identifiers for particular entities, the durability property feature assigned a particular type value and associated with certain particular entity identifiers, and entity data corresponding to the particular entity identifiers. The interface creates a new data model/structure 113 and inserts the new data model/structure 113 into the data store. The new data model/structure 113 includes the resource identifier, the particular event, and new set of data associated with the particular event. The new set of data includes the particular entity identifiers, the durability property feature assigned the particular type value for the certain particular entity identifiers, and the entity data corresponding to each of the particular entity identifiers.

In an embodiment, at 244 (shown in FIG. 2B), the view agnostic data manager provides the interface to services associated with workflows as an API 115 processed by the services from the workflows 116.

In an embodiment, at 245 (shown in FIG. 2B), the view agnostic data manager provides the interface as a model/user interface 123 to users.

Figure 3:
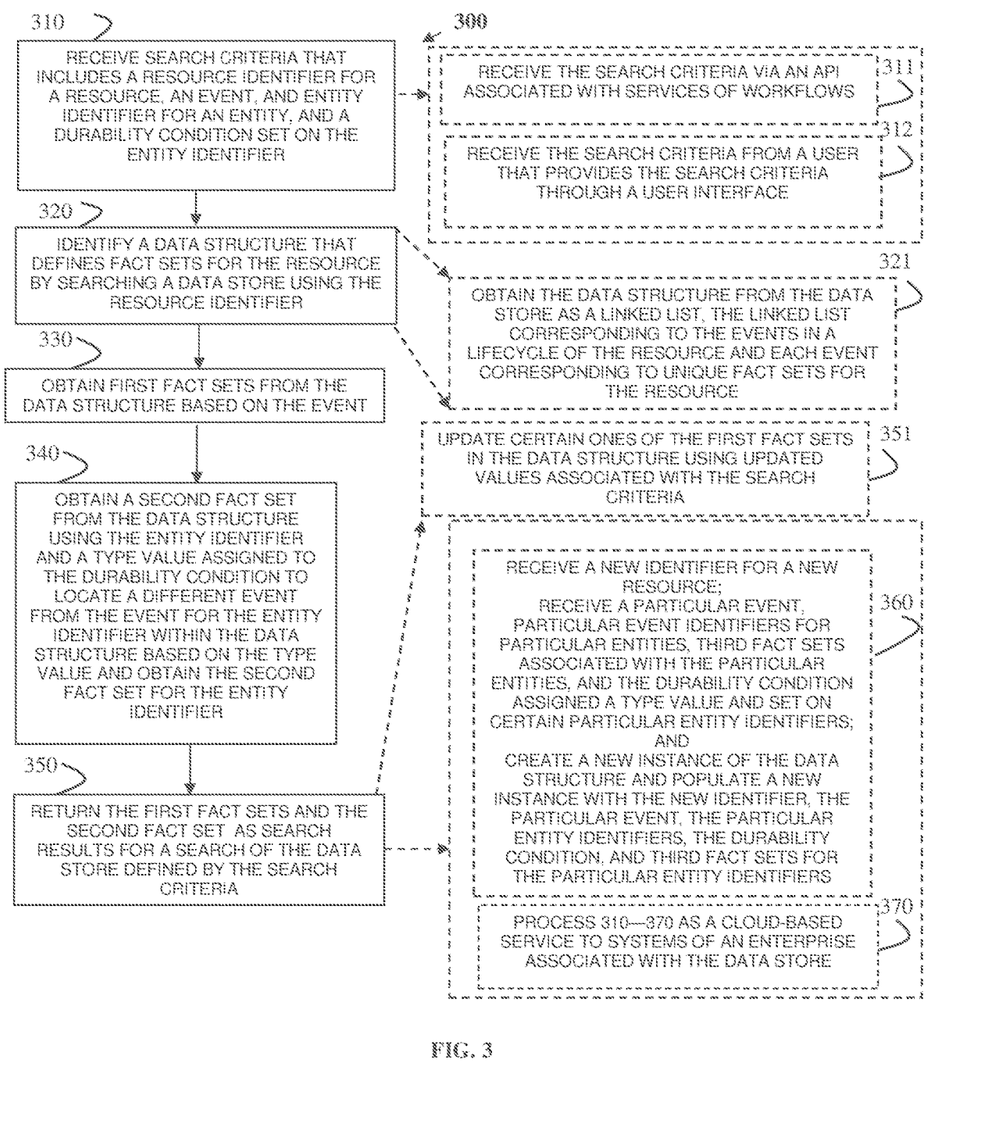
FIG. 3 is a flow diagram of another method for managing and providing a rule independent data model, according to an example embodiment.

FIG. 3 is a flow diagram of another method 300 for managing and providing a rule independent data model, according to an example embodiment. The software module (s) that implements the method 300 is referred to as a "durability data model service." The durability data model service is implemented as executable instructions programmed and residing within memory and/or a non-transitory computer-readable (processor-readable) storage medium and executed by one or more processors of one or more devices. The processors that execute the durability data model service are specifically configured and programmed to process the durability data model service. The durability data model service may have access to one or more network connections during its processing. The network connections can be wired, wireless, or a combination of wired and wireless.

In an embodiment, the device that executes the durability data model service is cloud 110. In an embodiment, the device that executes the durability data model service is server 110.

In an embodiment, the durability data model service is all of, or some combination of 113, 114, 115, 116, 123, and/or method 200. The durability data model service presents another, and in some ways an enhanced processing perspective from that which was discussed above for system 100 and method 200.

At 310, the durability data model service receives search criteria that includes a resource identifier for a resource, an event, an entity identifier for an entity, and a durability condition (e.g. durability property feature) set on the entity identifier.

In an embodiment, at 311, the durability data model service receives the search criteria via an API 115 associated with services of workflows 116.

In an embodiment, at 312, the durability data model service receives the search criteria from a user that provides the search criteria as input through a model/user interface 123.

At 320, the durability data model service identifies a data structure 113 that defines fact sets for the resource by searching a data store using the resource identifier.

In an embodiment, at 321, the durability data model service obtains the data structure 113 as a linked list. Each element in the linked list corresponding to a specific event, entities for the corresponding event, and each corresponding entity's fact set in the lifecycle for the resource. So, the linked list corresponding to the events in a lifecycle of the resource, and each event corresponding to one or more entities and each entity's unique fact set for the resource.

At 330, the durability data model service obtains first fact sets from the data model/structure 113. For example, the most recent set of data associated with the resource is obtained from the data model/structure 113.

At 340, the durability data model service obtains a second fact set from the data model/structure 113 using the entity identifier and a type value assigned to the durability condition to locate a different event from the event within the data model/structure 113 based on the type value and obtain the second fact set for the entity identifier.

At 350, the durability data model service returns the first fact sets and the second fact set as search results for a search of the data store. The search was defined by the search criteria, which included the durability condition with the assigned type value.

In an embodiment, at 351, the durability data model service updates certain ones of the first fact sets of the data model/structure 113 using updated values. The updated values provided or associated with the search criteria. In this case, an update request is received that includes both the search criteria and the updated values.

In an embodiment, at 360, the durability data model service receives a new identifier for a new resource, a particular event, particular event identifiers for particular entities, third fact sets associated with the particular entities, and the durability condition assigned a type value and set on certain particular entity identifiers. The durability data model service creates a new instance of the data model/structure 113 and populates the new instance with the new identifier, the particular event, the particular entity identifiers, the durability condition with the type value set on the certain particular entity identifiers, and the third fact sets for the particular entity identifiers.

In an embodiment, at 370, the durability data model service (310-370) processes and is provided as a cloud-based service to systems of an enterprise. The enterprise associated with the data store for managing the resources.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
defining a data structure that comprises sets of data associated with a resource, each set of data corresponding to an event in a lifecycle of the resource and each set of data comprises entity identifiers for entities and entity data for each corresponding entity;
maintaining a durability property feature on first entities for each set of data, each durability property feature assigned a type value that determines a location for obtaining the entity data associated with a corresponding first entity within the data structure;
managing a collection of data structures for a plurality of resources as a data store;
providing an interface for updating and querying the data store, wherein the interface permits creation of a new instance of the data structure, deletion of a particular data structure, and modification to values maintained in the sets of data for any given data structure of the data store;
receiving a specific event or a specific time period for a certain lifecycle of a certain resource through an application programming interface (API) or the interface; and
providing, by the API or the interface, certain fact sets for corresponding entities associated with the specific event or the specific time period from a corresponding data structure associated with the certain resource as the certain fact sets existed within the data store for the specific event or for the specific time period.

2. The method of claim 1 further comprising:
receiving, by the interface, search criteria for a search of the data store, the search criteria comprises at least one durability property feature assigned a particular type value and associated with a particular entity identifier for a particular entity;
searching, by the interface, the data store with the search criteria; and
returning, by the interface, search results corresponding to the search criteria and the entity data associated with the particular entity based on the searching.

3. The method of claim 1 further comprising:
receiving, by the interface, update criteria that comprises a resource identifier for a particular resource, a new event, particular entity identifiers for particular entities, entity data for the particular entities, and the durability property feature assigned a particular type value and associated with certain particular entity identifiers;
searching, by the interface, the data store with the resource identifier and identifying a particular data structure associated with the particular resource; and
updating, by the interface, the particular data structure with a new set of data, the new set of data comprises the particular entity identifiers, the durability property feature assigned the particular type value for the certain particular entity identifiers, and the entity data for the particular entities.

4. The method of claim 1 further comprising:
receiving, by the interface, a resource identifier for a new resource;
receiving, by the interface, a particular event, particular entity identifiers for particular entities, the durability property feature assigned a particular type value and associated with certain particular entity identifiers, and entity data corresponding to the particular entity identifiers; and
creating and inserting, by the interface, a new data structure into the data store, wherein the new data structure comprises the resource identifier, the particular event and a new set of data associated with the particular event, wherein the new set of data comprises the particular entity identifiers, the durability property feature assigned the particular type value for the certain particular entity identifiers, and the entity data corresponding to each of the particular entity identifiers.

5. The method of claim 1 further comprising, providing the interface to services associated with workflows as an Application Programming Interface (API) processed by the services from the workflows.

6. The method of claim 1 further comprising, providing the interface as a user interface to a user.

7. The method of claim 1, managing further includes maintaining each data structure as a linked list for corresponding events in a corresponding lifecycle of a corresponding resource.

8. The method of claim 7, wherein managing further includes process queries and updates to each linked list through the API processed by services and through a user interface provided to users.

9. A method, comprising:
receiving search criteria that comprises a resource identifier for a resource, an event, an entity identifier for an entity, and a durability condition set on the entity identifier;
identifying a data structure that defines fact sets for the resource by searching a data store using the resource identifier;
obtaining first fact sets from the data structure based on the event;
obtaining a second fact set from the data structure using the entity identifier and a type value assigned to the durability condition to locate a different event from the event for the entity identifier within the data structure based on the type value and obtain the second fact set for the entity identifier;
returning the first fact sets and the second fact set as search results for a search of the data store defined by the search criteria; and
updating certain ones of the first fact sets in the data structure using updated values associated with the search criteria.

10. The method of claim 9, wherein receiving further includes receiving the search criteria via an Application Programming Interface (API) associated with services of workflows.

11. The method of claim 9, wherein receiving further includes receiving the search criteria from a user that provides the search criteria through a user interface.

12. The method of claim 9, wherein identifying further includes obtaining the data structure from the data store as a linked list associated with the resource, wherein the linked list corresponding to particular events in a lifecycle of the resource and each event corresponding to unique fact sets for the resource.

13. The method of claim 9 further comprising:
receiving a new identifier for a new resource;
receiving a particular event, particular entity identifiers for particular entities, third fact sets associated with the particular entities, and the durability condition assigned a type value and set on certain particular entity identifiers;
creating a new instance of the data structure and populating a new entry within the new instance with the new identifier, the particular event, the particular entity identifiers, the durability condition set on the certain particular entity identifiers, and the third fact sets corresponding to the particular entity identifiers; and
inserting the new instance of the data structure into the data store.

14. The method of claim 9 further comprising, processing the method as a cloud-based service to an enterprise associated with the data store.

15. A system, comprising:
at least one server system comprising at least one server having at least one server processor and a server non-transitory computer-readable storage medium having server executable instructions;
the at least one server executable when executed by the at least one server processor from the server non-transitory computer-readable storage medium causes the at least one server processor to perform operations comprising:
maintaining a data store as a collection of data structures for lifecycles of resources, each data structure comprises fact sets for events associated with a corresponding lifecycle of a corresponding resource, each entry in a corresponding data structure associated with a particular event in the corresponding lifecycle and each entry further comprises entity identifiers for entities, each entity identifier associated with a particular fact set, at least one entity identifier associated with a durability condition with an assigned type value that references a past fact set for a corresponding entry identifier associated with a particular event for which a corresponding entry identifier's fact set is to be obtained within the corresponding data structure;

providing an Application Programming Interface (API) to services associated with workflows to search, create and modify each data structure using corresponding resources, the events, the entity identifiers, and the durability conditions and their assigned type values associated with certain entity identifiers;

providing a user interface to user-operated devices for users to search, create, and modify the collection of data structures the resources, the events, the entity identifiers, and the durability conditions and their assigned type values associated with the certain entity identifiers;

receiving a specific event or a specific time period for a certain lifecycle of a certain resource through the API or the user interface; and providing, by the API or the user interface, certain fact sets for corresponding entities associated with the specific event or the specific time period from the corresponding data structure associated with the certain resource as the certain fact sets existed within the data store for the specific event or for the specific time period.

16. The system of claim 15, wherein the user interface is one or more of a mobile application and browser pages hosted on the at least one server system and accessible to the users through browsers.

17. The system of claim 15, wherein at least one data structure for at least one resource comprises two or more entity identifiers associated with different types values assigned the durability condition and set on the two or more entity identifiers, each type value of the durability condition references a unique fact set within the corresponding data structure for each of the two or more entity identifiers.

* * * * *

UNITED STATES PATENT AND TRADEMARK OFFICE
CERTIFICATE OF CORRECTION

PATENT NO. : 12,259,856 B2  
APPLICATION NO. : 18/045788  
DATED : March 25, 2025  
INVENTOR(S) : Randal Page 1 of 1

It is certified that error appears in the above-identified patent and that said Letters Patent is hereby corrected as shown below:

In the Claims

In Column 13, Line 13, in Claim 15, after "and", delete "the"

Signed and Sealed this  
Third Day of June, 2025

Coke Morgan Stewart  
*Acting Director of the United States Patent and Trademark Office*